US011608852B2

(12) United States Patent
Wehner

(10) Patent No.: US 11,608,852 B2
(45) Date of Patent: Mar. 21, 2023

(54) SLIP-BETWEEN-CENTER PROPELLER SHAFT ASSEMBLY

(71) Applicant: Neapco Intellectual Property Holdings, LLC, Livonia, MI (US)

(72) Inventor: Rob Wehner, Livonia, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 319 days.

(21) Appl. No.: 16/924,505

(22) Filed: Jul. 9, 2020

(65) Prior Publication Data

US 2021/0010529 A1    Jan. 14, 2021

Related U.S. Application Data

(60) Provisional application No. 62/872,442, filed on Jul. 10, 2019.

(51) Int. Cl.
| | | |
|---|---|---|
| *F16C 3/03* | (2006.01) | |
| *F16D 3/84* | (2006.01) | |
| *F16D 3/06* | (2006.01) | |

(52) U.S. Cl.
CPC .................. *F16C 3/03* (2013.01); *F16D 3/06* (2013.01); *F16D 3/845* (2013.01); *F16C 2326/06* (2013.01); *Y10T 403/142* (2015.01)

(58) Field of Classification Search
CPC .......... F16C 3/03; F16C 2326/06; F16D 3/06; F16D 3/845; Y10T 403/142

USPC ......................................................... 464/162
See application file for complete search history.

(56) References Cited

U.S. PATENT DOCUMENTS

| | | | |
|---|---|---|---|
| 1,657,291 A | * | 1/1928 | Weiland .................... F16D 3/78 |
| | | | 464/162 |
| 5,716,276 A | | 2/1998 | Mangas et al. |
| 6,527,644 B2 | | 3/2003 | Glowacki et al. |

\* cited by examiner

*Primary Examiner* — Greg Binda
(74) *Attorney, Agent, or Firm* — Dickinson Wright PLLC

(57) ABSTRACT

A propeller shaft assembly for a vehicle including a first shaft extending along an axis between a proximal end and a distal end. The first shaft has an externally splined region presenting a plurality of external splines axially adjacent to the distal end. The externally splined region has a spline region outside diameter. A second shaft extends axially between a base end and a terminal end. The second shaft has a tube portion that extends from the base end, and an internally splined sleeve region that extends from the terminal end. The internally splined sleeve region receives the externally splined region of the first shaft and presents a plurality of internal splines interleaved with the external splines of the first shaft for providing relative axial movement between the first and second shafts while rotationally fixing the first and second shafts to one another. Components of the propeller shaft assembly have specific dimensional relationships to provide increased tool clearance, optimal bending stiffness, reduced mass and improved safety in vehicle crash situation.

15 Claims, 4 Drawing Sheets

SLIP-BETWEEN-CENTER PROPELLER SHAFT ASSEMBLY

CROSS-REFERENCE TO RELATED APPLICATIONS

This application claims the benefit of U.S. Provisional Patent Application Ser. No. 62/872,442 filed on Jul. 10, 2019, and titled "Slip-Between-Center Propeller Shaft Assembly," the entire disclosure of which is hereby incorporated by reference.

TECHNICAL FIELD

The subject disclosure relates to a propeller shaft assembly for a vehicle. More particularly, the subject disclosure relates to a slip-between-center propeller shaft assembly that is sized and arranged to provide improved crash telescoping, improved tool clearance and improved bending stiffness.

BACKGROUND OF THE DISCLOSURE

It is known in the art for vehicle propeller shaft assemblies to have a first shaft and a second shaft connected with a "slip-between-center" which rotationally fixes, but allows telescoping axial movement between, the first and second shafts in order to accommodate changes in length during vehicle operation. More particularly, the slip-between-center includes a plurality of external splines on the first shaft which are interleaved with a plurality of internal splines formed in a bore of the second shaft such that the splines are axially moveable relative to one another, but rotationally fixed relative to one another. It is known for such slip-between-center propeller shaft assemblies to be configured to allow an additional length reduction beyond that normally provided by the slip-between-center during a vehicle crash for added safety. For example, it is known for propeller shaft assemblies to have a second telescoping feature, such as a deformable boot seal and/or an extra length of one of the first and second shafts which is configured to breakaway during a vehicle crash. However, the deformable boot seal has to be replaced after being damaged, and the extra length of the first or second shaft is known to provide a relatively small bending stiffness, which may lower a safe operating speed and/or create risks of vibration. Furthermore, such assemblies often provide little clearance for tools during assembly due to large shaft diameters at ends of the propeller shaft assembly. Accordingly, there remains a need for improvements to vehicle propeller shaft assemblies.

SUMMARY OF THE INVENTION

A propeller shaft assembly for a vehicle includes a first shaft extending along an axis between a proximal end and a distal end. A joint is coupled with the proximal end of the first shaft and defines a plurality of bolt holes arranged in a bolt circle having a bolt circle diameter for receiving fasteners to connect the joint to a vehicle component. The first shaft has an externally splined region disposed adjacent to the distal end, and a cylindrical region having a cylindrical region outside diameter extending axially from the externally splined region toward the proximal end. A second shaft extends axially between a base end and a terminal end and includes an internally splined sleeve region extending from the terminal end and receiving the externally splined region of the first shaft for providing relative axial movement between the first and second shafts while rotationally fixing the first and second shafts to one another. The second shaft includes a tube portion having a tube outside diameter extending between the base end and the internally splined sleeve region. The cylindrical region outside diameter of the first shaft is less than or equal to 50% of the bolt circle diameter and greater than or equal to 30% of the tube outside diameter of the tube portion of the second shaft to provide for optimal bending stiffness of the propeller shaft assembly while providing tool access to the bolt holes. Accordingly, the subject propeller shaft assembly provides adequate bending stiffness while also providing adequate tool clearance.

According to another aspect of the disclosure, a propeller shaft assembly for a vehicle includes a first shaft extending along an axis between a proximal end and a distal end. A joint is coupled with the proximal end of the first shaft and defines a plurality of bolt holes arranged in a bolt circle having a bolt circle diameter for receiving fasteners to connect the joint to a vehicle component. The first shaft has an externally splined region disposed adjacent to the distal end and a cylindrical region having a cylindrical region outside diameter extending axially from the externally splined region toward the proximal end, and the first shaft is hollow and has an inside diameter. A second shaft extends axially between a base end and a terminal end and includes an internally splined sleeve region extending from the terminal end and receiving the externally splined region of the first shaft for providing relative axial movement between the first and second shafts while rotationally fixing the first and second shafts to one another. The cylindrical region outside diameter is less than or equal to 50% of the bolt circle diameter, and the inside diameter of the first shaft is greater than or equal to 40% of the cylindrical region outside diameter to provide optimal bending stiffness and reduced mass of the propeller shaft assembly while providing tool access to the bolt holes. Again, the subject propeller shaft assembly provides adequate bending stiffness while also providing adequate tool clearance.

According to another aspect of the disclosure, a propeller shaft assembly for a vehicle includes a first shaft extending along an axis between a proximal end and a distal end. The first shaft has an externally splined region disposed adjacent to the distal end. A second shaft extends axially between a base end and a terminal end and includes an internally splined sleeve region extending from the terminal end and receiving the externally splined region of the first shaft for providing relative axial movement between the first and second shafts while rotationally fixing the first and second shafts to one another. The sleeve portion has an internal wall defining a first axial bore for receiving the distal end of the first shaft. The second shaft includes a tube portion having an internal wall defining a second axial bore being fluidly connected to the first axial bore. A distance between the terminal end of the second shaft and the proximal end of the first shaft is greater than or equal to 70 mm when the first and second shafts are axially aligned in a normal position for continuous operation to provide for both operational and crash telescoping of the first shaft relative to the second shaft and for allowing the first shaft to enter the second axial bore in the event of a vehicle crash. The internally splined sleeve region of the second shaft includes a plurality of internal splines to define a spline inside diameter. The cylindrical region outside diameter of the first shaft is less than or equal to the spline inside diameter for a length of at least 60 mm between the externally splined region and the proximal end of the first shaft to allow the first shaft to axially move into the tube portion of the second shaft during a crash event. The ability of the first shaft to enter the second axial bore of the tube portion in the event of a vehicle crash prevents the propeller shaft assembly from buckling during vehicle crash scenarios, thus preventing components of the propeller shaft assembly from intruding into a fuel tank, propulsion battery, passenger compartment or other region or component of the vehicle during the crash. Furthermore, the cylindrical region outside diameter of the first shaft is greater than or equal to 30% of the tube outside diameter of the tube portion of the second shaft to provide for optimal bending stiffness of the propeller shaft assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a propeller shaft assembly 10 for a vehicle is provided. It should be appreciated that the subject propeller shaft assembly 10 may be employed for various types of vehicles including, but not limited to, automobiles and recreational vehicles.

Figure 1:
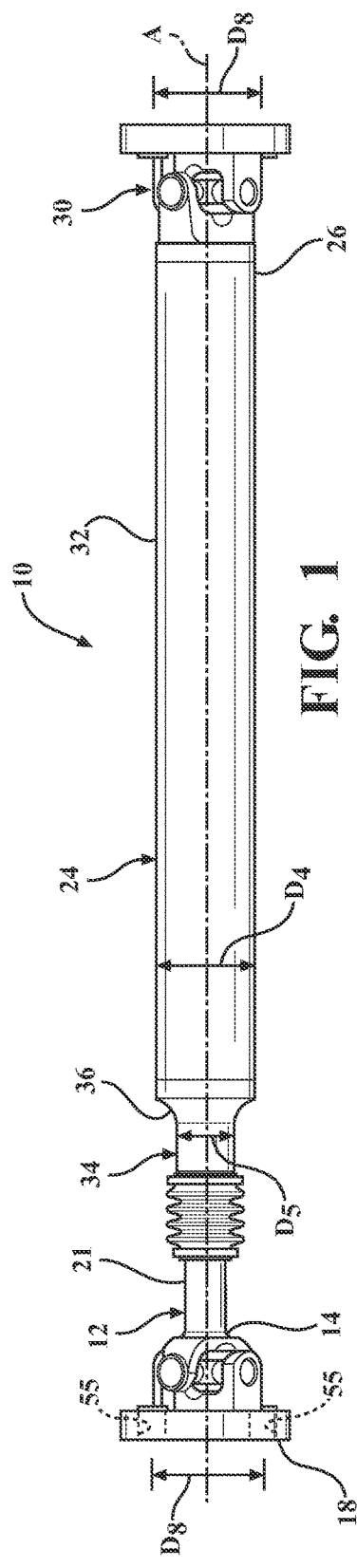
FIG. 1 is a side view of a propeller shaft assembly.
Figure 2:
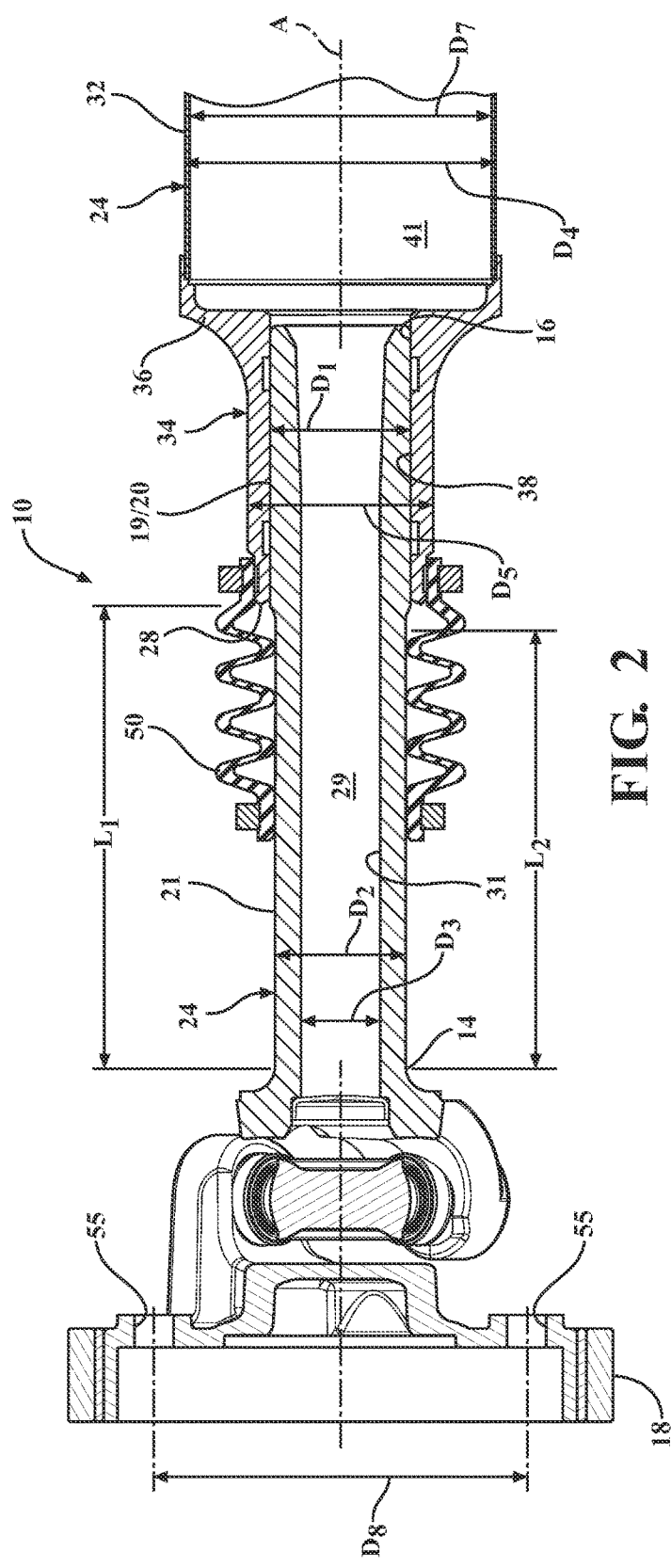
FIG. 2 is a side cross-sectional, partial view of a first and second shaft of the propeller shaft assembly.
Figure 6:
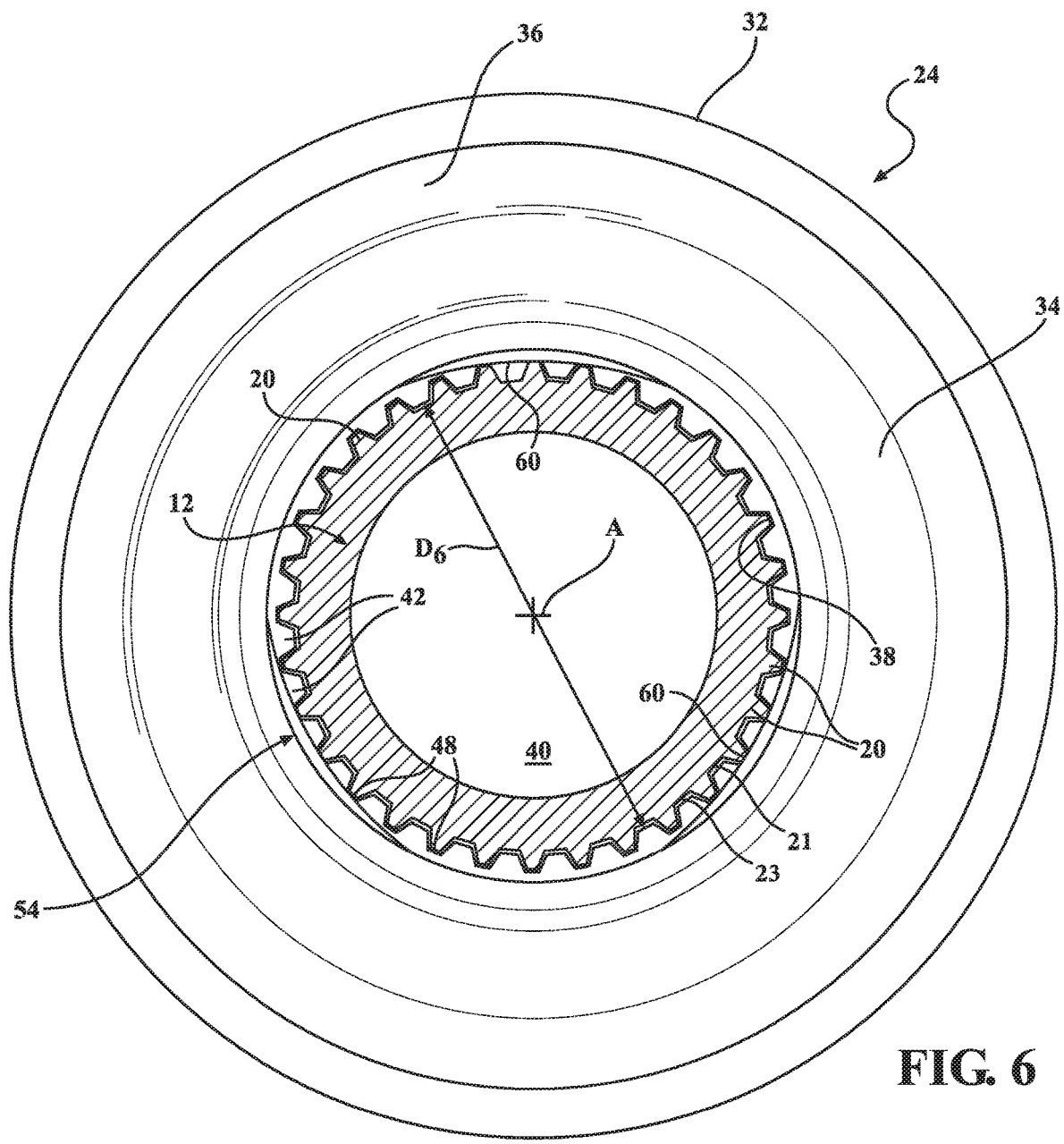
FIG. 6 is a view along a central axis of the second shaft of the propeller shaft assembly illustrating an arrangement of three contact points of a thrust ring.

As best illustrated in FIGS. 1, 2 and 6, the propeller shaft assembly 10 includes a first shaft 12 that extends along an axis A between a proximal end 14 and a distal end 16. A first universal joint 18 is connected to the proximal end 14. The first universal joint 18 is coupled, for example, to a transmission output shaft of the vehicle for receiving torque from the transmission output shaft. The first shaft 12 has an externally splined region 19 presenting a plurality of external splines 20 adjacent to the distal end 16. Each of the splines 20 extends axially and in spaced circumferentially from one another by a plurality of recesses 23. The first shaft 12 further has a cylindrical region 21 that extends axially from the externally splined region 19 to the proximal end 14. An outer surface of the externally splined region has a spline region outside diameter D1. An outer surface of the cylindrical region 21 has a cylindrical region outside diameter D2. The spline region outside diameter D1 is greater than the cylindrical region outside diameter D2. The first shaft 12 further defines a hollow 29 that extends between the proximal and distal ends 14, 16. The hollow 29 is defined by an inner wall 31 and has an inside diameter D3. The first shaft 12 is of a ductile cast iron material in order to advantageously provide the ability to create the hollow 29 with a core via a molding operation instead of via a machining operation.

As best shown in FIGS. 1 and 2, the propeller shaft assembly 10 further includes a second shaft 24 that extends axially between a base end 26 and a terminal end 28. A second universal joint 30 is connected to the base end 26. The second universal joint 30 is connected, for example, to a differential of the vehicle for transmitting torque from the second shaft to the differential. The second shaft 24 has a tube portion 32 that extends axially from the base end 26, and an internally splined sleeve region 34 that extends axially from the terminal end 28. The tube portion 32 and internally splined sleeve region 34 axially meet at a transition region 36 that tapers radially inwardly from the tube portion 32 to the internally splined sleeve region 34. An outside surface of the tube portion 32 has a tube region outside diameter D4, and an outside surface of the internally splined sleeve region 34 has a sleeve outside diameter D5. The tube region outside diameter D4 is greater than the sleeve outside diameter D5. The tube and internally splined sleeve regions 32, 34 are of an aluminum material. The size of the first shaft 12 and presence of the hollow 29 in the externally splined region 19 allows the use of an aluminum internally splined internally splined sleeve region 34 of the second shaft 24, without exceeding spline stress limits for softer materials. This is contrary to prior art propeller shaft assemblies which are typically made of steel and iron-based materials. Furthermore, the size and shape of the internally splined sleeve region 34 and transition region 36 of the second shaft 24 advantageously allows the internally splined sleeve region 34 to be welded to the tube portion 32 while maintaining strength and stiffness capabilities.

Figure 5:
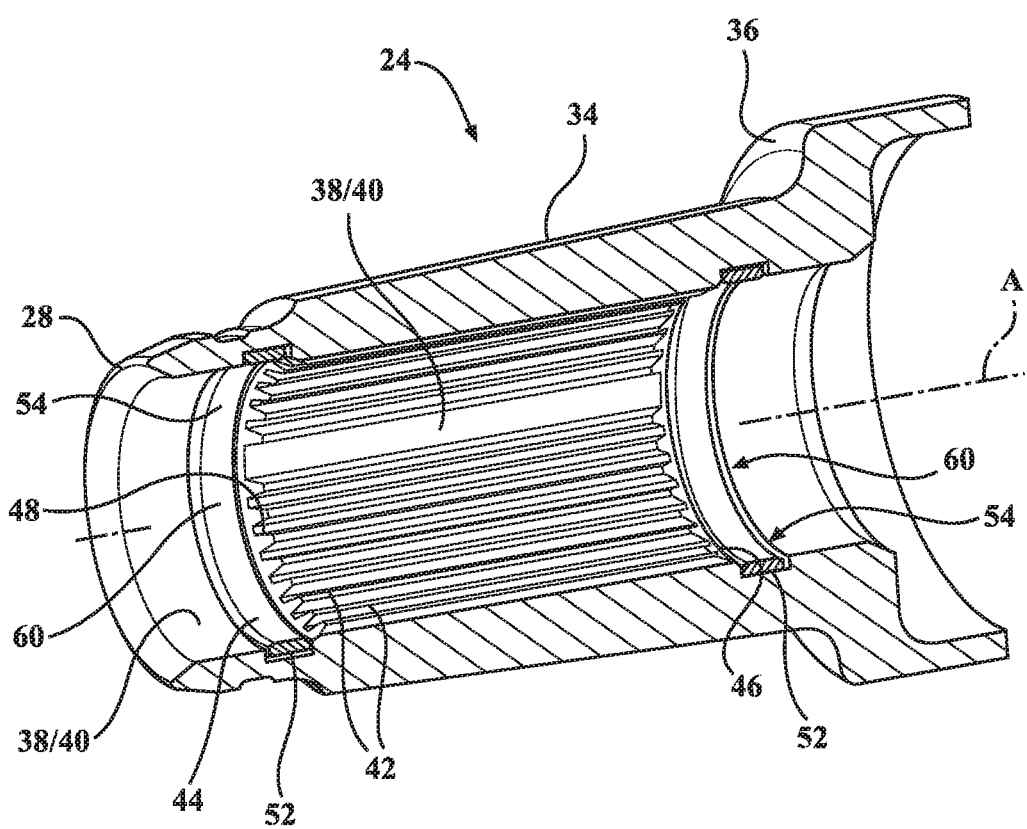
FIG. 5 is a perspective cutaway view of the second shaft of the propeller shaft assembly illustrating the positions of two thrust rings adjacent to internal splines.

As best presented in FIGS. 2 and 5-6, the internally splined sleeve region 34 has an internal wall 38 which defines a first axial bore 40 for receiving the distal end 16 of the first shaft 12. The internal wall 38 presents a plurality of internal splines 42 that extend axially between a first side 46 disposed adjacent to the distal end 16 of the first shaft 12, and a second side 44 spaced axially from the first side 46. The internal wall 38 has a spline inside diameter D6 (best shown in FIG. 6) at a radial innermost point of the splines 42. The internal splines 42 are spaced circumferentially from one another by a plurality of channels 48 (best shown in FIGS. 5-6). As best illustrated in FIG. 2, the internal splines 42 of the internally splined sleeve region 34 and the external splines 20 of the first shaft 12 are interleaved with one another such that they allow relative axial movement between the first and second shafts 12, 24 while rotationally fixing the first and second shafts 12, 24 to one another. The tube portion 32 of the second shaft 24 has an internal wall which defines a second axial bore 41 that is fluidly connected to the first axial bore 40. The internal wall of the tube portion 32 has an inner tube diameter D7. As shown, the internal splines 42 of the internally splined sleeve region 34 of the second shaft 24 and the external splines 20 of the spline region 19 of the first shaft 12 are both machined therein, and the internally splined sleeve region 34 and spline region 19 are both relatively small, thus providing decreased costs in fabricating the same.

A dust boot 50 partially surrounds the internally splined sleeve region 34 of the second shaft 24 and the first shaft 12 for preventing debris from passing between the first and second shafts 12, 24 during axial movement between the first and second shafts 12, 24. The dust boot is 50 comprised of an elastomeric material. During normal operation of the propeller shat assembly 10, the internal and external splines 42, 20 are configured to telescope relative to one another within axial limits of the dust boot 50.

As best shown in FIG. 5, the internal wall 38 of the internally splined sleeve region 34 defines at least one annular groove 52 that extends radially outwardly into the internal wall 38. According to a preferred arrangement, a pair of annular grooves 52 are positioned on opposite axial sides of the internal splines 42, each adjacent to one of the first and second sides 46, 44 of the internal splines 42. At least one radial thrust ring 54 is received in the at least one annular groove 52. According to the preferred arrangement, a pair of radial thrust rings 54 are each received in one of the annular grooves 52 and are disposed circumferentially about the external splines 20 of the first shaft 12. It should be appreciated that any number of annular grooves 52 and thrust rings 54 may be utilized.

Figure 4:
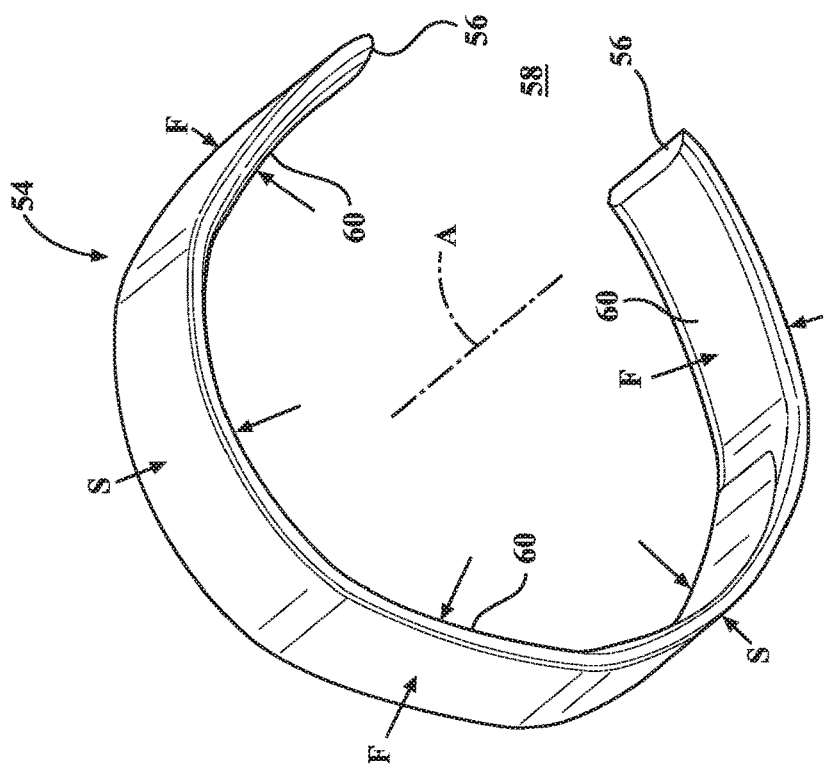
FIG. 4 is a perspective view of the thrust ring of the propeller shaft assembly.
Figure 3:
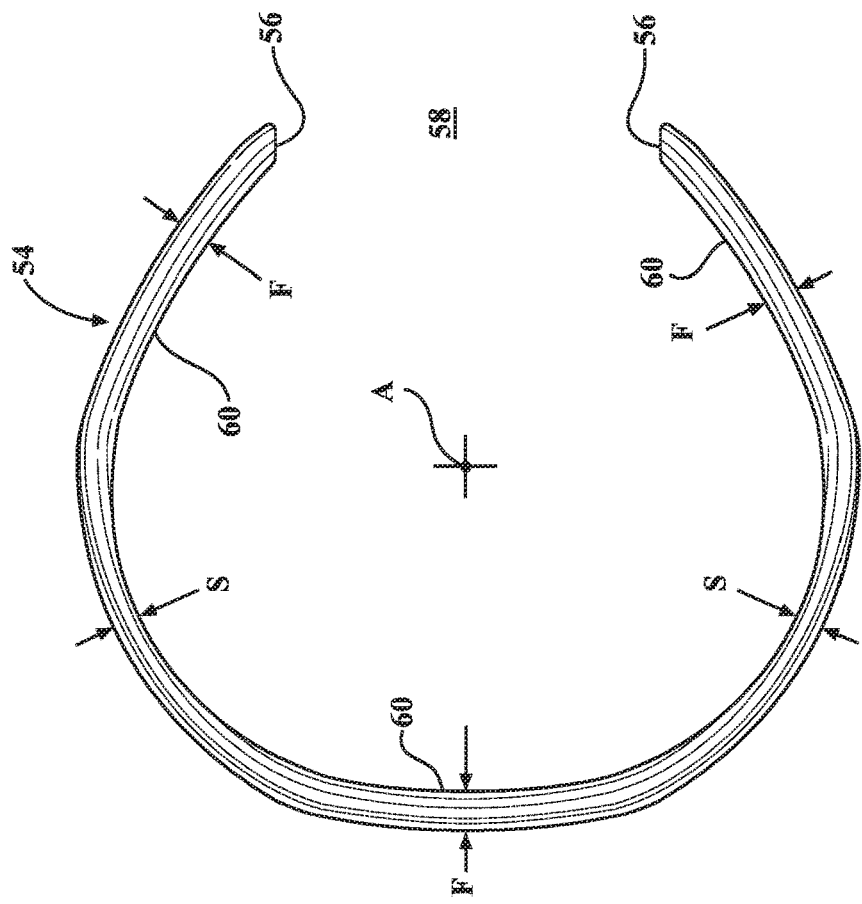
FIG. 3 is a side view of a thrust ring of the propeller shaft assembly.

As best shown in FIGS. 3-4, each of the thrust rings 54 have a non-circular shape and extend circumferentially between a pair of ends 56 disposed in spaced relationship with one another to define a gap 58 between the spaced ends 56. Due to the partial-ring shape of the thrust rings 54, they may easily be formed into a desired shape by bending. As best shown in FIGS. 3-4 and 6, each of the thrust rings 54 includes a plurality of contact points 60 that are positioned radially inward of the remainder of the thrust ring 54. As such, the contact points 60 extend radially past the channels 48 between the internal splines 42 such that they are biased against the external splines 20 of the first shaft 12 to cause a consistent radial preload against the external splines 20 to mitigate the detrimental imbalance effects caused by radial clearance between the first and second shafts 12, 24. In the preferred arrangement, the thrust rings 54 engage a major diameter of the external spines 20, however the thrust rings 54 could engage other diametrical locations of the first shaft 12 without departing from the subject disclosure. The non-continuous ring shape provided by the pair of ends 56 and gap 58 also allows the radial force applied against the internal splines to be chosen such that it prevents radial movement and imbalances between the first and second shafts 12, 24, while still allowing relative axial movement between the first and second shafts 12, 24. The plurality of contact points 60 are preferably evenly circumferentially spaced from one another to evenly provide the radial preload against the external splines 20. In a preferred arrangement, the thrust rings 54 each include three contact points 60, however other numbers of contact points 60 could be employed without departing from the subject disclosure.

As further illustrated in FIGS. 3-4, the contact points 60 of each of the thrust rings 54 have a first radial thickness F that is larger than a second radial thickness S of the remaining length of the thrust ring 54. In the preferred arrangement, the first thickness D is 1.75 mm and the second thickness S is 1 mm. The thicker first thickness F of the contact points 60 is provided in order to provide adequate bending stiffness and radial preload against the external splines 20. Furthermore, the regions between the contact points 60 with the thinner second thickness S do not significantly add to the bending resistance of the thickened contact points 60. This is provided because the gap 58 is provided between the contact points 60 which allows contraction of the thrust ring 54 during assembly of the propeller shaft assembly 10, thus there is no additional bending resistance provided in the gap 58. By reducing the bending resistance in the other regions between the contact points 60, the effort required to contract the radial thrust ring 54 and close the gap 58 for insertion of the radial thrust ring 54 through the bore 40 during assembly into the internally splined sleeve region 34 is reduced. A further benefit of reducing the bending resistance in the other regions between the contact points 60 is that a more uniform radial centering force at all three contact points 60 is provided against the external splines 20 of the first shaft 12 after assembly of the first shaft 12 into the internally splined sleeve region 34 of the second shaft 24.

The non-circular shape of the thrust rings 54 advantageously allows the regions between the contact points 60 to radially flex into the annular grooves 52 during assembly of the propeller shaft assembly 10. More particularly, during assembly, the thrust ring 54 deforms in this manner when the first shaft 12 is received in the bore 40 of the second shaft 24 and the external splines 20 are received between the internal splines 20. As a result of the non-circular, bent shape of the thrust rings 54, the radial thrust loads provided by the contact points 60 of the thrust rings 54 is low and tightly controlled. This allows a frictional force that counters relative axial sliding movement between the first and second shafts 12, 24 to be tuned such that a desired amount of sliding movement between the first and second shafts 12, 24 during vehicle assembly and/or operation is provided while also inhibiting relative radial movement between the first and second shafts 12, 24. In a preferred arrangement, the thrust rings 54 are comprised of a glass-filled nylon or similar material to provide a low modulus (low bending stiffness), high strength and a low coefficient of friction. Polytetrafluoroethylene (PTFE), silicone or other additives may be used in the nylon material to further reduce friction. FIG. 6 illustrates the plurality of contact points 60 prior to insertion of the first shaft 12. Insertion of the externally splined first shaft 12 radially displaces these areas of the thrust rings 54, causing the thrust rings 54 to conform to a more circular shape and provide a consistent radial preload between the internal and external splines 42, 20.

As best presented in FIGS. 1 and 2, components of the subject propeller shaft assembly 10 have specific dimensional relationships that provide various advantages. More particularly, the cylindrical region outside diameter D2 of the first shaft 12 is less than or equal to 50% of a bolt circle diameter D8 defined by a plurality of circumferentially spaced bolt holes 55 which receive attachment fasteners/bolts at the first universal joint 18 for connecting the joint 18 to other vehicle components. Sizing the cylindrical region outside diameter D2 relative to the bolt circle diameter D8 in the manner provides adequate tool clearance for securing the first universal joint 18 to the transmission or other component of the vehicle.

Furthermore, the cylindrical region outside diameter D2 of the cylindrical region 21 of the first shaft is greater than or equal to 30% of the tube region outside diameter D4 of the tube portion 32 of the second shaft 24 in order to provide optimal bending stiffness. According to the preferred arrangement, the cylindrical region outside diameter D2 of the cylindrical region 19 is 42.5 mm and the tube region outside diameter D4 of the tube portion 32 of the second shaft 24 is 101.6 mm.

Additionally, the inside diameter D3 of the hollow 29 of the first shaft 12 is greater than or equal to 40% of the cylindrical region outside diameter D2 of the first shaft to provide optimal bending stiffness and reduced mass. According to the preferred arrangement, the inside diameter D3 is 25 mm.

Furthermore, a first length L1 between the terminal end 28 of the second shaft 24 and the proximal end 14 of the first shaft 12 is greater than or equal to 70 mm when the first shaft 12 is axially within the internally splined sleeve region 34 of the second shaft 24 in a normal operating position in order to provide for telescoping of the first shaft 12 relative to the second shafts 24 within the confines of the dust boot 50 during normal operation, and for allowing the first shaft 12 to telescope outside of the confines of the dust boot 50 (tearing or displacing the dust boot 50) and into the second axial bore 41 in the event of a vehicle crash. As illustrated in FIG. 2, in the normal operating position, the distal end 16 of the first shaft 12 is approximately aligned with the transition region 36. Such "emergency telescoping" prevents the propeller shaft assembly 10 from buckling, which could otherwise intrude into a fuel tank, propulsion battery, passenger compartment or other region of the vehicle or vehicle component during the vehicle crash. This is contrary to prior art designs which have additional, separate telescoping features for providing crash telescoping. The first length L1 could also be greater than or equal to lengths of 85, 100 and 120 mm to provide further telescoping movement, depending on specific needs.

To further facilitate such emergency telescoping, the cylindrical region outside diameter D2 of the cylindrical region 21 of the first shaft 12 is equal to or smaller than the spline inside diameter D6 of the internally splined sleeve region of the second shaft 24 for a second length L2 of at least 70 mm when the first shaft and second shaft are axially aligned in the normal operating design position. The second length L2 could also be at least, for example, 85 mm, 100 mm or 120 mm depending on the specific application.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A propeller shaft assembly for a vehicle including:
    a first shaft extending along an axis between a proximal end and a distal end;
    a joint coupled with said proximal end of said first shaft and defining a plurality of bolt holes arranged in a bolt circle having a bolt circle diameter for receiving fasteners to connect the joint to a vehicle component;
    said first shaft having an externally splined region having a spline region outside diameter and disposed adjacent to said distal end, and a cylindrical region having a cylindrical region outside diameter extending axially from said externally splined region toward said proximal end;
    a second shaft extending axially between a base end and a terminal end and including an internally splined sleeve region extending from said terminal end receiving said externally splined region of said first shaft for providing relative axial movement between said first and second shafts while rotationally fixing said first and second shafts to one another;
    said second shaft including a tube portion having a tube outside diameter extending between said base end and said internally splined sleeve region and an inner tube diameter, wherein said inner tube diameter is larger than said spline region outside diameter;
    said cylindrical region outside diameter of said first shaft being less than or equal to 50% of said bolt circle diameter and greater than or equal to 30% of said tube outside diameter of said tube portion of said second shaft to provide for bending stiffness of said propeller shaft assembly while providing tool access to the bolt holes; and
    said distal end of said first shaft moveable into said tube portion of said second shaft.

2. The propeller shaft assembly of claim 1, wherein said first shaft is hollow along said cylindrical region and said externally splined region and defines an inside diameter being greater than or equal to 40% of said cylindrical region outside diameter to provide bending stiffness and reduced mass of said propeller shaft assembly.

3. The propeller shaft assembly of claim 1, wherein a distance between said terminal end of said second shaft and said proximal end of said first shaft is greater than or equal to 70 mm when said first and second shafts are axially aligned in a normal position to provide for both operational and crash telescoping of said first shaft relative to said second shaft and for allowing said first shaft to extend into said tube portion of said second shaft in the event of a vehicle crash; wherein in said normal position, said distal end of said first shaft is axially aligned with a transition region of said second shaft located axially between said sleeve region and said tube region of said second shaft.

4. The propeller shaft assembly for a vehicle as set forth in claim 1, wherein said internally splined sleeve region of said second shaft includes a plurality of internal splines to define a spline inside diameter, and wherein said cylindrical region outside diameter is less than or equal to said spline inside diameter for a length of at least 60 mm between said between said externally splined region and said proximal end of said first shaft to allow said first shaft to axially move into said tube portion of said second shaft during a crash event.

5. The propeller shaft assembly of claim 1, wherein said first shaft is comprised of cast ductile iron.

6. The propeller shaft assembly of claim 1, wherein said tube and internally splined sleeve regions of said second shaft are comprised of aluminum material to allow said tube and internally splined sleeve regions to be welded to one another.

7. A propeller shaft assembly for a vehicle including:
    a first shaft extending along an axis between a proximal end and a distal end;
    a joint coupled with said proximal end of said first shaft and defining a plurality of bolt holes arranged in a bolt circle having a bolt circle diameter for receiving fasteners to connect the joint to a vehicle component;
    said first shaft having an externally splined region having a spline region outside diameter and disposed adjacent to said distal end, and a cylindrical region having a cylindrical region outside diameter extending axially from said externally splined region toward said proximal end, and said first shaft being hollow and having an inside diameter;
    a second shaft extending axially between a base end and a terminal end and including an internally splined sleeve region extending from said terminal end and receiving said externally splined region of said first shaft for providing relative axial movement between said first and second shafts while rotationally fixing said first and second shafts to one another;
    said second shaft including a tube portion having an inner tube diameter, wherein said inner tube diameter is larger than said spline region outside diameter; and
    said cylindrical region outside diameter being less than or equal to 50% of said bolt circle diameter, and said inside diameter of said first shaft being greater than or equal to 40% of said cylindrical region outside diameter to provide bending stiffness and reduced mass of said propeller shaft assembly while providing tool access to the bolt holes;

said distal end of said first shaft moveable into said tube portion of said second shaft.

8. The propeller shaft assembly for a vehicle of claim 7, wherein said tube portion of said second shaft has a tube outside diameter, and wherein said cylindrical region outside diameter of said first shaft is greater than or equal to 30% of said tube outside diameter to provide for bending stiffness of said propeller shaft assembly.

9. The propeller shaft assembly of claim 7, wherein a distance between said terminal end of said second shaft and said proximal end of said first shaft is greater than or equal to 70 mm when said first and second shafts are axially aligned in a normal position to provide for both operational and crash telescoping of said first shaft relative to said second shaft and for allowing said first shaft to enter said tube portion of said second shaft in the event of a vehicle crash; wherein in said normal position, said distal end of said first shaft is axially aligned with a transition region of said second shaft located axially between said sleeve region and said tube region of said second shaft.

10. The propeller shaft assembly for a vehicle as set forth in claim 7, wherein said internally splined sleeve region of said second shaft includes a plurality of internal splines to define a spline inside diameter, and wherein said cylindrical region outside diameter is less than or equal to said spline inside diameter for a length of at least 60 mm between said between said externally splined region and said proximal end of said first shaft to allow said first shaft to axially move into said tube portion of said second shaft during a crash event.

11. The propeller shaft assembly of claim 7, wherein said first shaft is of a cast ductile iron.

12. A propeller shaft assembly for a vehicle including:
a first shaft extending along an axis between a proximal end and a distal end;
said first shaft having an externally splined region having a spline region outside diameter and disposed adjacent to said distal end, and a cylindrical region having a cylindrical region outside diameter extending axially from said externally splined region toward said proximal end;
wherein said first shaft is hollow and defines an inside diameter being greater than or equal to 40% of said cylindrical region outside diameter to provide for bending stiffness and reduced mass of said propeller shaft assembly;
a second shaft extending axially between a base end and a terminal end and including an internally splined sleeve region extending from said terminal end and receiving said externally splined region of said first shaft for providing relative axial movement between said first and second shafts while rotationally fixing said first and second shafts to one another, said sleeve portion having an internal wall defining a first axial bore for receiving said distal end of said first shaft;
said second shaft including a tube portion having an internal wall defining a second axial bore having an inner tube diameter being fluidly connected to said first axial bore, and wherein said inner tube diameter is larger than said spline region outside diameter; and
said distal end of said first shaft moveable into said tube portion of said second shaft;
wherein a distance between said terminal end of said second shaft and said proximal end of said first shaft is greater than or equal to 70 mm when said first and second shafts are axially aligned in a normal position for continuous operation to provide for both operational and crash telescoping of said first shaft relative to said second shaft and for allowing said first shaft to enter said second axial bore in the event of a vehicle crash;
wherein said internally splined sleeve region of said second shaft includes a plurality of internal splines to define a spline inside diameter, and wherein said cylindrical region outside diameter of said first shaft is less than or equal to said spline inside diameter for a length of at least 60 mm between said externally splined region and said proximal end of said first shaft to allow said first shaft to axially move into said tube portion of said second shaft during a crash event;
wherein said cylindrical region outside diameter of said first shaft is greater than or equal to 30% of said tube outside diameter of said tube portion of said second shaft to provide for bending stiffness of said propeller shaft assembly.

13. The propeller shaft assembly for a vehicle as set forth in claim 12 wherein said distance between said terminal end of said second shaft and said proximal end of said first shaft is greater than or equal to 85 mm when said first and second shafts are axially aligned in the normal position.

14. The propeller shaft assembly for a vehicle as set forth in claim 12 wherein said distance between said terminal end of said second shaft and said proximal end of said first shaft is greater than or equal to 100 mm when said first and second shafts are axially aligned in the normal position.

15. The propeller shaft assembly for a vehicle as set forth in claim 12 wherein said distance between said terminal end of said second shaft and said proximal end of said first shaft is greater than or equal to 120 mm when said first and second shafts are axially aligned in the normal position.

* * * * *